United States Patent
Wang et al.

(10) Patent No.: US 10,542,249 B2
(45) Date of Patent: Jan. 21, 2020

(54) STEREOSCOPIC VIDEO GENERATION METHOD BASED ON 3D CONVOLUTION NEURAL NETWORK

(71) Applicant: ZHEJIANG GONGSHANG UNIVERSITY, Hangzhou, Zhejiang (CN)

(72) Inventors: Xun Wang, Zhejiang (CN); Leqing Zhu, Zhejiang (CN); Huiyan Wang, Zhejiang (CN)

(73) Assignee: ZHEJIANG GONGSHANG UNIVERSITY, Hangzhou, Zhejiang (CN)

( * ) Notice: Subject to any disclaimer, the term of this patent is extended or adjusted under 35 U.S.C. 154(b) by 157 days.

(21) Appl. No.: 15/755,556

(22) PCT Filed: Dec. 29, 2016

(86) PCT No.: PCT/CN2016/112812
§ 371 (c)(1),
(2) Date: Feb. 27, 2018

(87) PCT Pub. No.: WO2018/119808
PCT Pub. Date: Jul. 5, 2018

(65) Prior Publication Data
US 2019/0379883 A1    Dec. 12, 2019

(51) Int. Cl.
*G06F 17/50*    (2006.01)
*G06N 3/08*    (2006.01)
(Continued)

(52) U.S. Cl.
CPC ........... *H04N 13/261* (2018.05); *G06F 17/15* (2013.01); *G06N 3/084* (2013.01); *H04N 13/257* (2018.05)

(58) Field of Classification Search
None
See application file for complete search history.

(56) References Cited

U.S. PATENT DOCUMENTS

2012/0051625 A1    3/2012 Appia et al.

FOREIGN PATENT DOCUMENTS

| CN | 102223553 A | 10/2011 |
|----|-------------|---------|
| CN | 102932662 A | 2/2013 |

(Continued)

*Primary Examiner* — Anand S Rao
*Assistant Examiner* — Tyler B Edwards

(57) ABSTRACT

A stereoscopic video generation method based on 3D convolution neural network is disclosed, which is able to convert existing 2D video sources into stereoscopic videos. The method includes preparing the training data, dividing the training video sources into left eye view sequences and right eye view sequences; and then processing the left eye image sequences through shot segmentation via fuzzy C-means clustering method, calculating a mean image of all left eye images, subtracting the mean image from the left eye images, taking the right eye images as a training target; training the obtained 3D convolution neural network through the training data; processing the 2D video sources which need to be converted into stereoscopic videos in the same way as training set, inputting to the trained 3D convolution neural network to obtain the right eye view image sequences of the 2D videos; and finally combining the two to be stereoscopic videos.

8 Claims, 2 Drawing Sheets

(51) Int. Cl.
*G06N 3/04* (2006.01)
*H04N 13/261* (2018.01)
*G06F 17/15* (2006.01)
*H04N 13/257* (2018.01)

(56) References Cited

FOREIGN PATENT DOCUMENTS

| | | | |
|---|---|---|---|
| CN | 103716615 A | | 4/2014 |
| CN | 105979244 A | * | 9/2016 |
| CN | 105979244 A | | 9/2016 |
| CN | 106504190 A | | 3/2017 |

* cited by examiner

STEREOSCOPIC VIDEO GENERATION METHOD BASED ON 3D CONVOLUTION NEURAL NETWORK

CROSS REFERENCE OF RELATED APPLICATION

This is a U.S. National Stage under 35 U.S.C 371 of the International Application PCT/CN2016/112812, filed Dec. 29, 2016.

BACKGROUND OF THE PRESENT INVENTION

Field of Invention

The present invention relates to a stereoscopic video generation method, and more particularly to a monocular-to-binocular stereoscopic video generation method based on 3D convolution neural network.

Description of Related Arts

Due to strong sense of reality and immersion, the 3D film is very popular with the audience. In recent years, the 3D film has accounted for a large share in the film market, and accounted for 14% to 21% of North American box office total revenue between 2010 and 2014. In addition, with the emergence of virtual reality (VR) market, the head mounted display also has a further demand for 3D contents.

Equipment and production costs are higher for directly producing 3D film format, so it has become a more ideal choice to convert 2D films into 3D films. A typical professional conversion process usually comprises firstly manually creating a depth map for each frame, and then combining the original 2D video frame with the depth map to produce a stereoscopic image pair based on depth map rendering algorithm. However, this process is still expensive and requires costly manpower. Therefore, high production costs become a major stumbling block to the large-scale development of 3D film industry.

In recent years, many researchers have sought to produce 3D video from a single video sequence through existing 3D model libraries and depth estimation techniques. The current depth information is able to be obtained through both hardware and software. The hardware, which has access to the depth information, comprises laser range finder and 3D depth somatosensory camera KINECT launched by MICROSOFT. Common software methods comprise multi-view stereo, photometric stereo, shape from shading, depth from defocus, and a method based on machine learning. The method based on machine learning is mainly adapted for 3D films converted from 2D films, and especially in recent years with the wide application of depth learning framework, the framework is also applied to the depth estimation. For example, Eigen et al. firstly achieves an end-to-end monocular image depth estimation through multi-scale convolution neural network (CNN). However, the size of the outputted result is limited, so it is predicted that the depth map is much smaller than the inputted original image, and the height and the width of the obtained depth map are respectively only 1/16 of the original image. Therefore, Eigen and Fergus improve the network structure later which comprises firstly up-sampling the original realized CNN output, and then connecting with the convolution result of the original input image, and then processing through multiple convolutional layers to deepen the neural network for obtaining the final outputted depth map with higher resolution.

However, the depth map obtained by the above method still has problems that the contour is not clear enough and the resolution is low. In addition, the complement problem of occlusion and other invisible parts caused by the change of view is still difficult to be solved.

SUMMARY OF THE PRESENT INVENTION

An object of the present invention is to provide a monocular-to-binocular stereoscopic video generation method to overcome deficiencies of the prior art, which is able to automatically convert existing 2D video sources into stereoscopic videos that are able to be played on 3D devices through training 3D deep full convolution neural network.

The object of the present invention is achieved by a technical solution as follows. A stereoscopic video generation method based on 3D convolution neural network comprises steps of:

preparing training data, training the 3D convolution neural network, training the obtained neural network model through taking 2D videos as a left eye video input, generating right eye videos, synthesizing the left and right videos to 3D videos and outputting.

The training data are downloaded through web; a sufficient number (at least 20) of non-animated 3D movies are adopted; all videos are firstly divided into left eye views and right eye views; blank frames which may occur at title, tail and shot transition are canceled, so as to obtain training samples with 5000000 frames. The rich training samples enable the trained CNN to have a strong generalization capability.

FIG. 1 shows the 3D full convolution neural network which comprises six convolutional layers, wherein the former two layers are 3D convolutional layers for automatically completing invisible voids in the right eye views caused by occlusion or local displacement from left and right eye disparity. Contents of these invisible voids are likely to appear in adjacent frames. FIG. 2 shows the 3D convolution, wherein: every pixel value outputted by the 3D convolution layers is obtained though convolving pixel values in a 3×3 region corresponding to adjacent three frames and a convolution filter; a time window width is equal to 3 which is corresponding to three (3×3) convolution kernels, weights of the three (3×3) convolution kernels are different from each other but are unchanged in a space-time window sliding process. The latter four convolutional layers of the six convolutional layers in FIG. 1 are 2D convolutional layers which convert the inputted left eye views into the right eye views through multiple non-linear transformations. The output of every convolutional layer is activated through ReLu function and then inputted into next layer. A size of the 3D convolution kernels is 3×3×3, an edge thereof is not processed through zero expansion (pad=0), a stride thereof is one (stride=1); it can be known from formulas (1) to (3) that, through one 3D convolution, a window width of a time domain and a space domain is shrunk for two units. A size of the 2D convolution kernels is 3×3, every edge thereof is expanded by one unit (pad=1), a stride thereof is one (stride=1); it can be known from the formulas (1) to (3) that, through one 2D convolution, a size of a feature dimension remains unchanged.

$$t_1 = (t_0 + 2 \times pad - kernel\_size)/stride + 1 \quad (1);$$

$$w_1 = (w_0 + 2 \times pad - kernel\_size)/stride + 1 \quad (2);$$

$$h_1 = (h_0 + 2 \times pad - kernel\_size)/stride + 1 \quad (3).$$

The final output of the 3D convolution neural network is color images with RGB channels. As shown in FIGS. 1 and 2, every frame factually comprises three channels, and different channels are corresponding to different filter groups respectively, so that every 3D convolutional layer has three groups of 3×3×3 convolution kernels, every 2D convolutional layer has three groups of 3×3 convolution kernels. Five frame RGB images are inputted into the 3D convolution neural network, and one frame RGB image is outputted finally.

Generally speaking, five continuous frames of left eye view result in one frame of right eye view. However, both the height and width of the right eye view shrink by four units than the left eye views. Therefore, during network training, the central area of the middle frame of the input five frames and the output right eye view are aligned to obtain the loss, which is back-propagated to adjust network parameters.

The correlation between adjacent frames in the time domain exists only within the same shot. Therefore, before network training, the videos are firstly split to shots through shot segmentation. The shot segmentation algorithm adopted by the present invention is based on the fuzzy C-means clustering algorithm, which specifically comprises steps of:

firstly, converting every frame of a video from RGB (Red-Green-Blue) space to YUV (Luminance and Chrominance) space through a conversion formula of $$Y=0.299R+0.587G+0.114B$$

$$U=0.492(B-Y)$$

$$V=0.877(R-Y) \quad (4).$$

and then calculating a color histogram of YUV channels of every frame and calculating an inter-frame difference between adjacent frames through a formula of $$x(f_i, f_{i+1})=\Sigma_{k=1}^{n}|H^Y(f_i, k)-H^Y(f_{i+1}, k)|+\Sigma_{k=1}^{m}(|H^U(f_i, k)-H^U(f_{i+1}, k)|+|H^V(f_i, k)-H^V(f_{i+1}, k)|) \quad (5),$$

here, m is the histogram bin number of a UV channel, n is the histogram bin number of a Y channel, m<n, H (f,k) represents the amount of pixels within the $k^{th}$ bin of frame f.

All inter-frame differences of the video are clustered into three categories through the fuzzy C-means clustering algorithm: shot change class (SC), suspected shot changes class (SSC) and non-shot changed class (NSC). The suspected shot changes class refers to the frames which are difficult to determine whether the shot is changed or not.

The fuzzy C-means clustering algorithm (whose input is video adjacent inter-frame difference sequences and output is adjacent frame types) comprises steps of:

(1) initializing a sort number c=3 and an index weight w=1.5, and assigning all membership value $\mu_{ik}$ (i=1, . . . , c, k=1, . . . , n, here, n is a total number of the inter-frame difference sequences) to 1/c;

(2) calculating c clustering centers $c_i$ through a formula (6), here, i=1, . . . ,c;

(3) calculating a value function J through a formula (7), wherein if the J is smaller than a determined threshold, or a variation of the J relative to a former value function is smaller than a threshold, then the fuzzy C-means clustering algorithm is stopped; and (4) calculating a new membership value $\mu_{ik}$ through a formula (8) and return to the step (2), wherein:

$$c_i=(\Sigma_{j=1}^{n}\mu_{ij}^{w}x_j)/\Sigma_{j=1}^{n}\mu_{ij}^{w} \quad (6),$$

$$J=\Sigma_{i=1}^{c}\Sigma_{j=1}^{n}\mu_{ij}^{w}\|c_i-x_j\|^2 \quad (7),$$

$$\mu_{ij}=1/\Sigma_{k=1}^{c}(\|c_i-x_j\|/\|c_k-x_j\|)^{2/(w-1)} \quad (8).$$

The suspected shot change class SSC is processed as follows. When there are multiple SSC frames SSC(k) (k=j, . . . , j+n−1) between two continuous shot change frames SC(i) and SC(i+1), if a condition is met as follows:

$$H\_SSC(k) \geq 0.025 * [H\_SC(i)+H\_SC(i+1)] \quad (9),$$

then the frame SSC(k) is taken as a shot change class, wherein H_SSC(k) represents a histogram bin difference of the SSC(k), H_SC(i)+H_SC(i+1) represents a histogram bin difference of the SC(i) and the SC(i+1). However, the shots should not be continuously changed between adjacent frames. Therefore, some frames which meet the formula (9) are deleted.

The mean image of all input training samples is calculated. While training, the mean image is subtracted from every frame of the left eye views inputted into the network. Similarly, when using the trained network model to generate the right eye views, the mean image also needs to be subtracted from the inputted left eye views.

In FIG. 1, when the network parameters are adjusted by back propagation with a stochastic gradient descent method, the loss function is calculated through mean square error, that is, $$L(Y, \overline{Y}) = \frac{1}{n}\sum_{i=1}^{n} (\overline{Y}_i - Y_i)^2, \quad (10)$$

wherein $\tilde{Y}$ is an output of the last layer of the 3D convolution neural network, Y is a real right eye view corresponding to the middle frame of five continuous frames participating in the 3D convolution, n is an amount of outputted pixels. The network is trained through minimizing the loss function. The training is completed when the loss function is converged during the training process.

In FIG. 1, when the right eye views are generated by the trained 3D convolution neural network model from input left eye views, the output of the last layer of the network in the interval of [0, 255] is rounded to obtain the three-channel RGB images, and the gray scale of every channel is an integer within the interval of [0, 255].

Beneficially effects of the present invention are as follows. Based on the deep convolution neural network model obtained through large data set training, the left eye videos automatically generate the right eye videos, so that human participation is maximally reduced during the stereoscopic video production process, thereby improving the efficiency of the stereoscopic video production and reducing production costs.

DETAILED DESCRIPTION OF THE PREFERRED EMBODIMENT

The present invention is further explained in detail with accompanying drawings as follows.

Stereoscopic video generation is a technique that occurs when the existing 3D signal is relatively small. It is able to automatically produce the 3D display effect by calculating daily watched 2D films or TV (television) shows.

Figure 1:
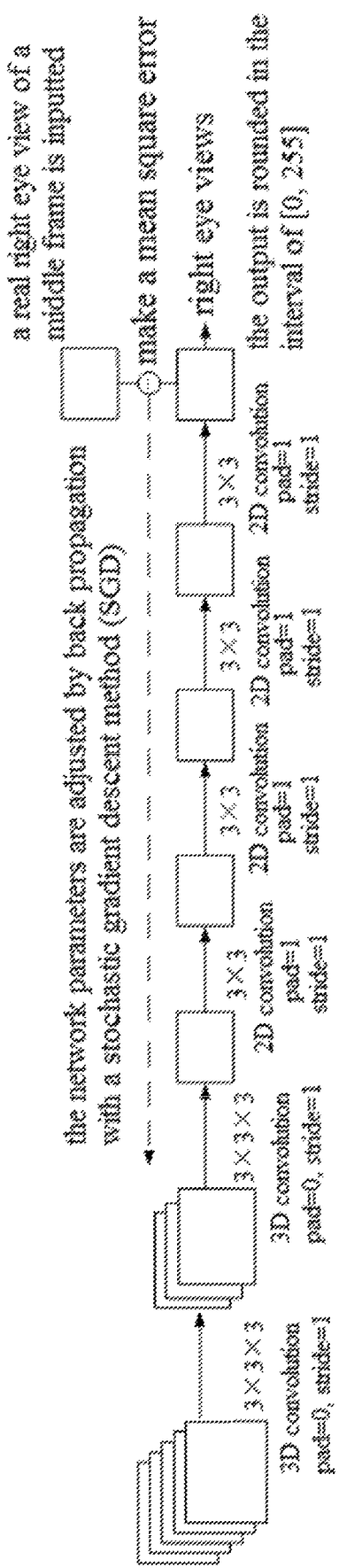
FIG. 1 shows a 3D full convolution neural network structure.
Figure 2:
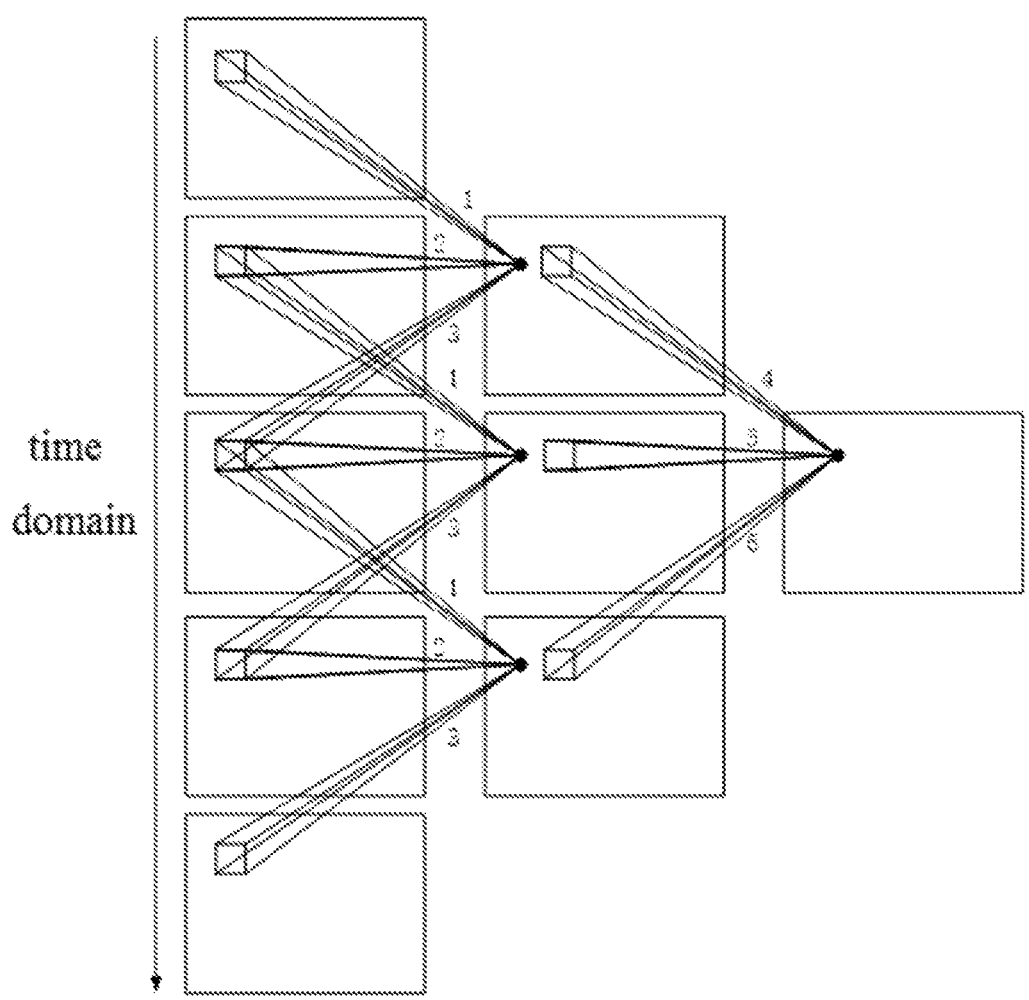
FIG. 2 is a schematic view of 3D convolution, wherein convolutional kernels with same number share the weight.

As shown in FIG. 1, a stereoscopic video generation method based on 3D convolution neural network according to a preferred embodiment of the present invention is provided, wherein the stereoscopic video generation method is able to take an existing 2D video source as a left eye video, and then automatically generate a corresponding right eye video through the 3D convolution neural network, and then combine the left eye video with the right eye video and convert the two into a video which is able to be played on a 3D stereoscopic display device.

The stereoscopic video generation method based on 3D convolution neural network comprises steps as follows.

(1) Training the 3D convolution neural network.

In order to avoid the over-fitting phenomenon while training the deep convolution neural network, it is necessary to prepare sufficient training data. In the present invention, more than twenty non-animated 3D films downloaded from the web are taken as the training data; and then 3D videos are divided into left eye JPEG image sequences and right eye JPEG image sequences through FFmpeg commands; and then blank frames which may appear in titles, tails and shots shading are deleted from the sequences.

All training samples are tailored or scaled to the same height and width, and the mean image of all training images is calculated.

The left eye JPEG image sequences separated from every movie are processed through shot segmentation by the fuzzy C-means clustering method mentioned in the summary of the present invention; and then the mean image is subtracted from the left eye images to obtain input data for training; first two frames and last two frames are removed from the right eye images of the corresponding shots, and two pixels are cropped off from each of four sides to get a training target, and then the training pairs are saved in an HDF5 format file.

Convolutional kernel parameters of every layer of the 3D convolution neural network are initialized through Gaussian distribution in the range of [0, 0.01] with a standard deviation of 0.01, the initial learning rate of every layer is set to 0.01, the learning rate is reduced to $1/10$ of the former one for each 100000 training steps, the Momentum is set to 0.9.

Through the above training data and parameters, the 3D convolution neural network shown in FIG. 1 is trained, when the loss calculated by the formula (10) tends to converge (that is, when the change of the loss relative to the former loss is smaller than the threshold value, such as 0.01) or the amount of the training is more than 1000000 steps, the training is over.

(2) Generating right eye videos via 2D left eye videos through the obtained 3D convolution neural network after being trained.

The 2D videos to be converted are taken as the left eye videos; and then converted into image sequences through the method as same as the training, processed through shot segmentation by the fuzzy C-means clustering method, and converted into images with the same size of the training images through scaling or cropping; the mean image of the training images is subtracted from every frame, and then inputted into a 3D convolution neural network through taking the shots as a unit; the output of the last convolutional layer is a floating-point type. It is necessary to obtain three-channel RGB images whose gray scale is an integer in the range of [0,255]. Therefore, the final output of the network is rounded to obtain expected right eye views, i.e., while meeting the condition of v∈[0,255], the final output is rounded to the nearest integer, when v<0, the final output is 0; when v>255, the output final is 255. One middle frame of right eye view is generated from every five-frame left eye views, the generation process slides forward with stride of one in the time domain, so that the corresponding right eye views of every shot are obtained except the former two initial frames and the last two end frames. It is acceptable that four frames of each shot are lost during the video editing process.

(3) Synthesizing left and right eye videos into 3D videos

When the left eye videos are converted into the right eye videos through the network shown in FIG. 1, due to the shrinkage of the space window of the 3D convolutional layer, both the height and the width of the final right eye views are 4 pixels smaller than the left eye views. Therefore, before the synthesis, two pixels are respectively cropped off from all four edges of the left eye views. Accordingly, two paths of virtual images which are generated from two points of view are obtained, and then two video sources are synthesized which input to the screen, and finally are composed to one input video source according to the specific format based on the type of the screen, which is displayed on the screen.

The foregoing is intended to be only a preferred embodiment of the present invention, but the protective scope of the present invention is not limited thereto, and any changes or substitutions that may be readily apparent to those skilled in the art within the technical scope of the present invention are intended to be encompassed within the protective scope of the present invention. Accordingly, the protective scope of the present invention should be based on the protective scope defined by the claims.

What is claimed is:

1. A stereoscopic video generation method based on 3D convolution neural network, comprising steps of:
   (1) preparing training data comprising:
       downloading a sufficient number of non-animated 3D movies as the training data through web, dividing the non-animated 3D movies into left eye views and right eye views, and deleting blank frames which occur at title, tail and shot transition;
   (2) training the 3D convolution neural network comprising:
       training the 3D convolution neural network through taking the left eye views of the prepared training data in the step (1) as an input and the right eye views as a target, wherein the 3D convolution neural network comprises six convolutional layers, a former two of the six convolutional layers are 3D convolutional layers and a latter four thereof are 2D convolutional layers; to calculate a loss function, comparing a central area of the right eye views with a same size of a network output with the network output which is back propagated to adjust network parameters; and
   (3) generating a stereoscopic video through the trained full convolution neural network comprising:

inputting 2D videos as the left eye views into the trained 3D convolution neural network, normalizing an output of the network to an integer in a range of 0 to 255, that is, taking the output of the network to be a nearest integer in the range of 0 to 255, obtaining right eye views, merging the left eye views with the right eye views according to display characteristics into a view source, outputting and displaying the view source on a display.

2. The stereoscopic video generation method based on 3D convolution neural network, as recited in claim 1, wherein in the step (1), the training sample is firstly processed through shot segmentation because a correlation between video frames exists only within a same shot; the shot segmentation comprises:

firstly, converting every frame of a video from RGB (Red-Green-Blue) space to YUV (Luminance and Chrominance) space through a conversion formula of $$Y=0.299R+0.587G+0.114B$$

$$U=0.492(B-Y)$$

$$V=0.877(R-Y) \quad (1),$$

and then calculating a color histogram of YUV channels of every frame and calculating an inter-frame difference between adjacent frames through a formula of $$x(f_i, f_{i+1})=\Sigma_{k=1}^{n}|H^Y(f_i, k)-H^Y(f_{i+1}, k)|+\Sigma_{k=1}^{m}(|H^U(f_i, k)-H^U(f_{i+1}, k)|+|H^V(f_i, k)-H^V(f_{i+1}, k)|) \quad (2),$$

here, m is a histogram bin number of a UV channel, n is a histogram bin number of a Y channel, m<n, H (f, k) represents that an amount of pixels within the $k^{th}$ bin of a frame f, the shot segmentation is achieved based on the histogram inter-frame difference through a fuzzy C-means clustering method.

3. The stereoscopic video generation method based on 3D convolution neural network, as recited in claim 1, wherein in the step (1), the training sample takes the shot as a unit to organize files, a mean image of all left eye views in the training samples is calculated and the mean image is subtracted from every frame of the left eye views.

4. The stereoscopic video generation method based on 3D convolution neural network, as recited in claim 1, wherein in the step (2), the trained 3D convolution neural network is a full convolution neural network without full connection layer which is not sensitive to a size of the image frame to be processed.

5. The stereoscopic video generation method based on 3D convolution neural network, as recited in claim 1, wherein in the network of the step (2), a size of 3D convolution kernels is 3×3×3, a size of 2D convolution kernels is 3×3, a stride of the 3D and 2D convolution kernels is one, an edge of 3D convolution is not processed through zero expansion, an edge of 2D convolution is expanded to remain a size of the image before and after convolution unchanged, an output of every convolutional layer is activated through ReLu function and then inputted into a next layer.

6. The stereoscopic video generation method based on 3D convolution neural network, as recited in claim 1, wherein in the network of the step (2), a time window size of a first 3D convolution kernel is t0=5, that is, one convolution processes five frames images; through a formula (3), due to pad=0, stride=1, kernel_size=3, an outputted time window size is shrunk to t1=3 after being convoluted by the convolution kernel with the size of 3×3×3; and then through a second 3D convolution kernel, the time window size is further shrunk to 1, latter 2D convolutions only process single frame images; similarly, through formulas (4) and (5), in former two 3D convolutions, due to pad=0, a height and a width are shrunk 2 units; in latter 2D convolutions, due to pad=(kernel_size−1)/2, the height and the width before and after the convolutions are unchanged, here, $$t_1=(t_0+2\times pad-kernel\_size)/stride+1 \quad (3)$$

$$w_1=(w_0+2\times pad-kernel\_size)/stride+1 \quad (4)$$

$$h_1=(h_0+2\times pad-kernel\_size)/stride+1 \quad (5).$$

7. The stereoscopic video generation method based on 3D convolution neural network, as recited in claim 1, wherein in the network of the step (2), while training, the time window slides forward at a stride of one in each shot; since the 3D convolution shrinks in time domain, first two frames and last two frames of every shot in target view (namely, the right eye view) is discharged when calculating a loss.

8. The stereoscopic video generation method based on 3D convolution neural network, as recited in claim 1, wherein in the step (2), while training the network and adjusting network parameters through back propagation, a loss function is calculated through mean square error of $$L(Y, \bar{Y}) = \frac{1}{n}\sum_{i=1}^{n}(\bar{Y}_i - Y_i)^2 \quad (6)$$

here, $\hat{Y}$ is an output of the last layer of the 3D convolution neural network, Y is a real right eye view corresponding to a middle frame of five continuous frames participating in the 3D convolution, n is an amount of outputted pixels.

* * * * *